July 18, 1950 A. E. HAYES, JR 2,515,957
BALANCED CAPACITY PHONOGRAPH
Filed March 13, 1947
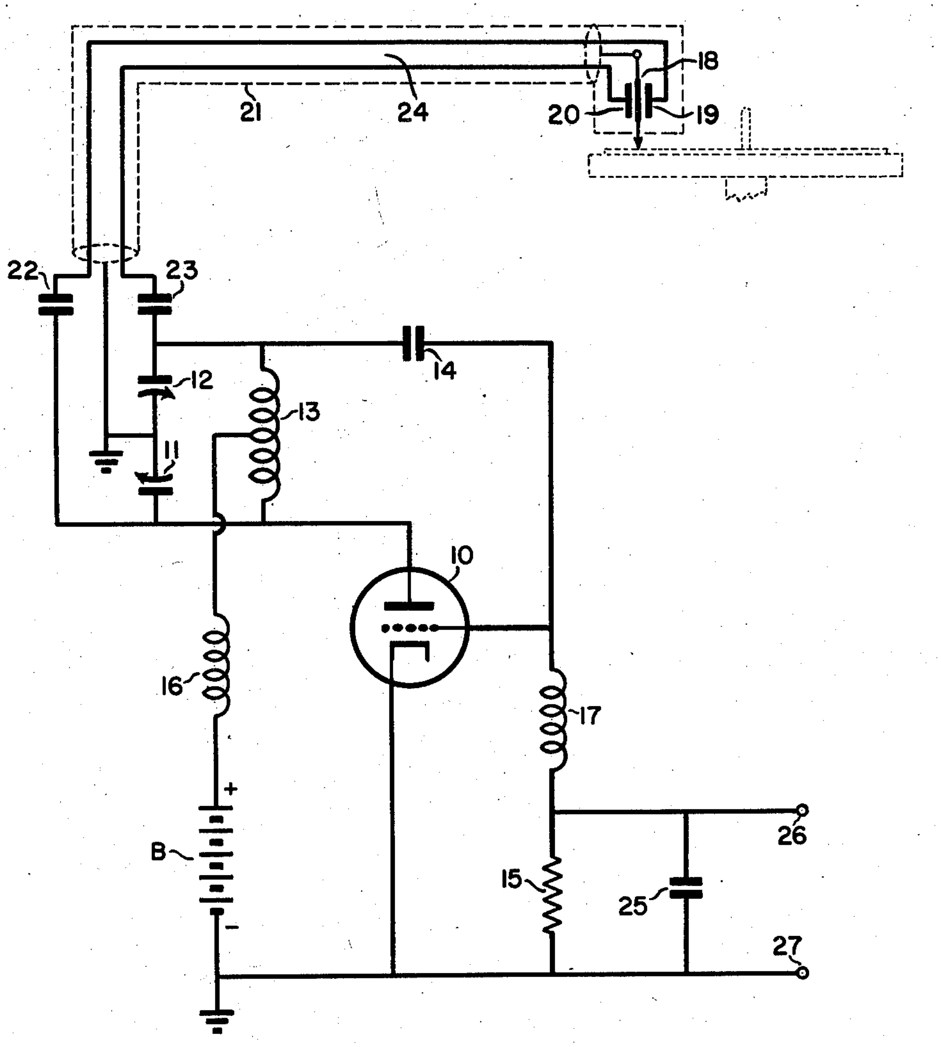
Inventor
ALBERT E. HAYES JR.
By Robert T. Killman
Attorney Patented July 18, 1950

2,515,957

UNITED STATES PATENT OFFICE 2,515,957

BALANCED CAPACITY PHONOGRAPH

Albert E. Hayes, Jr., West Hartford, Conn., assignor to Bendix Aviation Corporation, Towson, Md., a corporation of Delaware Application March 13, 1947, Serial No. 734,314

2 Claims. (Cl. 179—100.4)

This invention is directed to electronic phonograph record reproducing means. More specifically it is directed to record reproducing means of the type wherein a pickup comprising a variable reactance alters the degree of feedback in a high frequency oscillator.

It has been proposed in the past to reproduce sound records, recorded in the well known amplitude variation manner, by converting the mechanical displacements produced during the recording process into a variable frequency deviation of a predetermined radio frequency carrier. The frequency modulated carrier energy is then subjected to a detection process for converting the frequency deviations into corresponding amplitude variations. One of the most important advantages of this method is that a capacity pickup device can be employed with the variable frequency oscillator. This pickup device is highly economical compared to the relatively expensive types of electrical pickup devices employed in the usual and conventional method of converting the sound vibrations into audio signal energy.

It is recognized, however, that arrangements of the character described are limited in their application because of the necessity of maintaining a high order of frequency stability of the frequency-modulated oscillator to prevent its drifting entirely out of the range of the associated detector circuit. This is further complicated by the fact that installations of the type wherein pickup units of economical construction may be used to advantage do not lend themselves to the economical inclusion of oscillators of sufficient stability. This fact has tended to limit the use of the economical capacity type pickup to the detriment of the industry at large.

A phonograph arrangement which eliminates the above-enumerated shortcomings of prior capacitive pickup arrangements is disclosed in my copending U. S. application for Letters Patent, Serial Number 660,944, now abandoned. The reference application discloses an unbalanced capacity pickup arranged to vary the magnitude of feedback in an oscillator.

The use of a balanced pickup in an arrangement of the character described has the advantage that deformations and deflections of the conductors associated with the pickup element itself have a subtractive effect among the multiple conductors of the balanced arrangement, and therefore tend to cancel themselves out.

It is an object of this invention to provide a circuit for use with a balanced capacity type phonograph pickup which does not require the use of a frequency modulatable oscillator of high stability.

It is a further object of this invention to provide a circuit for use with a balanced capacity type phonograph pickup which is not affected appreciably by conditions of instability such as changes of applied potentials or of long-term changes in tube characteristics.

It is a further object of this invention to provide a circuit for a phonograph pickup which eliminates one or more of the shortcomings of prior art arrangements.

Other and further objects and advantages of this invention will be apparent from a consideration of the following detailed description taken in connection with the accompanying drawing, the single figure of which is a schematic diagram of a circuit embodying the invention. It is to be expressly understood, however, that neither the description nor the drawing is intended to define the scope of the invention, reference for the latter purpose being had to the appended claims.

Referring now to the drawing there is illustrated a vacuum tube 10, connected to operate as a Colpitts oscillator, having a tank circuit comprising the condensers 11 and 12 and an inductor 13. The control electrode of the tube is connected to the upper terminal of the inductor 13 through a condenser 14, and to ground through a series circuit comprising a resistor 15 and a radio frequency choke 17. The anode of the tube is directly connected to the lower terminal of the inductor 13. The + terminal of a source B of voltage is connected through a radio frequency choke 16 to a tap on the inductor 13.

It will be manifest that the arrangement so far described comprises a conventional Colpitts oscillator in which the degree of feedback is determined by the ratio of the capacity of the condenser 12 to that of the condenser 11, and that the bias voltage developed across the grid-leak resistor 15 is determined, in part, by said degree of feedback.

Associated with the above-described circuit is a balanced capacity type phonograph pickup having a movable plate 18 and a pair of fixed plates 19 and 20 disposed in symmetrical relationship in proximity to the movable plate 18 and insulated therefrom. The movable plate 18 is grounded to the grounded shield 21 of a cable 24. The fixed plates 19 and 20, respectively, are connected through blocking condensers 22 and 23, respectively to the anode and control electrode, respectively, of the tube 10.

A pair of output terminals 26 and 27 are connected to the extremities of the resistor 15, and a condenser 25 is connected in shunt therewith. The condenser 25 has a low impedance at the frequency of the Colpitts oscillator, but has a comparatively high impedance to the frequency of the signals being applied mechanically to the movable plate 18 of the pickup. The condenser 25 is a simple filter to prevent the appearance of oscillator-frequency signals at the output terminals 26 and 27. Additional filtering means may be added between the resistor 15 and the output terminals without departing from the scope of this invention.

It will be manifest that displacement of the movable plate 18, to which a stylus cooperating with the modulations of a groove in a phonograph record may be secured, will alter the degree of feedback, or "drive" in the oscillator circuit. Movement of the plate 18 in the direction of the plate 19 will, of course, increase the "drive," and movement in the direction of the plate 20 will decrease the "drive."

It is known to those skilled in the art that the magnitude of the rectified D. C. bias voltage developed across the resistor 15 in an arrangement of the character described will be increased with an increase in "drive," and will be decreased with a decrease of "drive." It will be obvious, therefore, that movement of the plate 18 in accordance with the convolutions of a record groove will cause an alternating potential to appear at the output terminals 26, 27, which will comprise an audio frequency wave signal which may be amplified by conventional audio frequency amplifying means, and reproduced, if desired, by a suitable electromechanical transducer. A relatively steady D. C. potential, the steady state bias of the oscillator, will also be present as a component of the signal appearing at the output terminals, but this may be removed, if desired, by a blocking condenser or its equivalent.

Although there will be both amplitude and frequency modulation of the output of the oscillator circuit, it should be noted that the signal is derived from the bias circuit, rather than the output circuit, and that there is no need to correct for long period variations in either the frequency or the amplitude of the output thereof.

Although there is illustrated an arrangement in accordance with the instant invention embodying a particular type of oscillator circuit, it should be understood that it is not intended that the invention be held limited to this arrangement. Other types of oscillators, such as Hartley, Colpitts, Armstrong, or ultraudion may be used without departing from the scope of the invention as defined in the appended claims, provided the variable impedance is arranged to exert a controlling action on the phase and/or the magnitude of the voltage fed from the input to the output circuit.

What is claimed is:

1. An electro-mechanical transducer comprising in combination: a high frequency oscillator circuit of the Colpitts type, said oscillator circuit comprising a tuned feed back circuit; a balanced pickup of the capacitive type connected to form a part of said tuned feed back circuit; a grid leak bias resistor in said oscillator circuit; and means for deriving an output voltage equal to the voltage developed across the said grid leak bias resistor.

2. An electro-mechanical transducer comprising in combination: a high frequency oscillator circuit, said oscillator circuit comprising an electron discharge tube having an anode, a cathode and a control grid; a parallel resonant circuit connected between said anode and said cathode, said parallel resonant circuit including an inductance; a balanced pickup of the capacitive type having a pair of fixed electrodes and a movable central electrode, said central electrode being connected to said cathode; means connecting said capacitive pickup in parallel with said inductance as a part of said parallel resonant circuit; a grid leak bias resistor connected between said grid and said cathode; and means for deriving an output voltage equal to the voltage developed across the said grid leak bias resistor.

ALBERT E. HAYES, Jr.

REFERENCES CITED

The following references are of record in the file of this patent:

UNITED STATES PATENTS

| Number | Name | Date |
|---|---|---|
| 1,796,155 | Leffler | Mar. 10, 1931 |
| 2,333,001 | Goldstine | Oct. 26, 1943 |
| 2,436,129 | Weathers | Feb. 17, 1948 |
| 2,441,464 | Albright | May 11, 1948 |
| 2,443,125 | Weathers | June 8, 1948 |

FOREIGN PATENTS

| Number | Country | Date |
|---|---|---|
| 314,560 | Great Britain | June 24, 1929 |